United States Patent [19]
Yoshino

[11] Patent Number: 5,015,042
[45] Date of Patent: May 14, 1991

[54] ANTILOCK CONTROL DEVICE

[75] Inventor: Masato Yoshino, Itami, Japan

[73] Assignee: Sumitomo Electric Industries, Ltd., Osaka, Japan

[21] Appl. No.: 454,003

[22] Filed: Dec. 20, 1989

[30] Foreign Application Priority Data

Dec. 21, 1988 [JP] Japan .................................. 63-322832

[51] Int. Cl.$^5$ .............................................. B60T 8/60
[52] U.S. Cl. .................................. 303/96; 188/181 C; 303/100; 303/103; 303/109
[58] Field of Search ...................... 303/91, 96, 98, 100, 303/102, 103, 108, 109; 364/426.02; 188/181 C

[56] References Cited

U.S. PATENT DOCUMENTS

| 4,787,682 | 11/1988 | Muto .................................... 303/109 |
| 4,802,711 | 2/1989 | Muto et al. ............................ 303/96 |

*Primary Examiner*—Douglas C. Butler
*Attorney, Agent, or Firm*—Cushman, Darby & Cushman

[57] ABSTRACT

An antilock control device is provided with sensors for sensing wheel speed of each of wheels mounted in the vehicle and a calculator for calculating a highest wheel speed, a second highest wheel speed and a lowest wheel speed. The calculator has a step for detecting a condition such that a difference between the second highest wheel speed and the lowest wheel speed is greater than a first threshold and, at the same time, a difference between the highest wheel speed and the second highest wheel speed is greater than a second threshold, and a step for counting a predetermined time period. When the condition is detected for a period longer that the predetermined time period, the wheel with the highest wheel speed is identified as a small diameter wheel which should be inhibited from being used for calculation of the estimated vehicle speed.

10 Claims, 2 Drawing Sheets

ANTILOCK CONTROL DEVICE

BACKGROUND OF THE INVENTION

1. Field of the Invention

The present invention generally relates to an antilock control system for a motor vehicle, and more particularly, to an antilock control system wherein the wheel speeds of a motor vehicle are detected to judge whether the wheels are in the way of the lock-up process or the antilocking process, thereby to control the hydraulic brake pressure, so that the problem caused when a wheel of a smaller diameter is mounted in one of a plurality of wheels of the motor vehicle in emergency etc. is solved.

2. Description of Related Arts

According to a conventional arrangement of the type referred to above for the antilock control, a wheel speed sensor is mounted in association with each of a plurality of wheels (generally, front and rear wheels 4 in total) which generates a signal indicating the wheel speed and outputs the same to a control device. The wheel speed of each wheel is calculated in an operating circuit provided in the control device. Then, the speed of the vehicle body is estimated on the basis of the highest wheel speed among the wheel speeds of the all the wheels. Since it is possible to judge whether or not the wheel is in the tendency of being locked, or whether or not the same is in the tendency of being released from the locked state, by the comparison between the estimated speed of the vehicle body and the wheel speed, the hydraulic pressure to be fed to the wheels can be controlled based on the result of the comparison.

In the above-described conventional arrangement, however, there may be an inconvenience when a wheel having a diameter smaller than that of other wheels is used in emergency cases, such as for replacing a flat tire, etc. Specifically, the wheel of the smaller diameter rotates faster than the other wheels, and therefore the wheel speed of this wheel is determined to be the highest wheel speed, resulting in an excessive estimation of the speed of the vehicle body. Consequently, as a result of the comparison between the overestimated speed of the vehicle body and the wheel speed of the other wheel(s), the other wheel(s) are erroneously judged to be slipping, whereby unnecessary reduction of the hydraulic pressure takes place, or repressuring after the antilocking operation is delayed.

In order to solve the above-described inconveniences in the simplest manner, such arrangement may be proposed that the second highest wheel speed, in place of the highest wheel speed, is always used to obtain the estimated vehicle speed. However, when the same wheel is mounted in every wheel, the accuracy of the estimated speed of the vehicle body is undesirably deteriorated.

SUMMARY OF THE INVENTION

Accordingly, the present invention has been developed with a view to substantially solving the above-described inconveniences inherent in the conventional arrangements, and has for its essential object to provide an antilock control device for a motor vehicle which can control an antilock system positively not to make any erroneous operations by insufficient braking force or the like, thus maintaining the accuracy in obtaining the estimated vehicle speed not only when the same size wheels are mounted, but also when a wheel of a smaller diameter is mounted in one of the wheels.

In accomplishing the above-described object, an antilock system according to the present invention employs a small diameter wheel detecting system which comprises: sensor means for sensing wheel speed of each of wheels mounted in the vehicle and for detecting a highest wheel speed, a second highest wheel speed, and a lowest wheel speed; first detector means for detecting a first condition such that a difference between the second highest wheel speed and the lowest wheel speed is greater than a first threshold and, at the same time, a difference between the highest wheel speed and the second highest wheel speed is greater than a second threshold; a first timer for counting a first predetermined time period; and an identifying means for identifying, when the first condition lasts longer that the first predetermined time period, the wheel with the highest wheel speed as a small diameter wheel.

According to the present invention, the small diameter wheel detecting system further comprises: a second detector for detecting a second condition such that a difference between the highest wheel speed and the second highest wheel speed is less that a third threshold; a second timer for counting a second predetermined time period; and a cancelling means for cancelling the identification of the wheel as identified by the identifying means.

According to the present invention, the antilock control device is so arranged that the above first and third thresholds are set to be equal to each other, the above first and second predetermined time periods are set to be equal to each other, or the above second threshold is set in proportion to the estimated speed of the vehicle body.

BRIEF DESCRIPTION OF THE DRAWINGS

This and other objects and features of the present invention will become apparent from the following description taken in conjunction with one preferred embodiment thereof with reference to the accompanying drawings throughout which like parts are designated by like reference numerals, and in which.

DESCRIPTION OF THE EMBODIMENT

Figure 1:
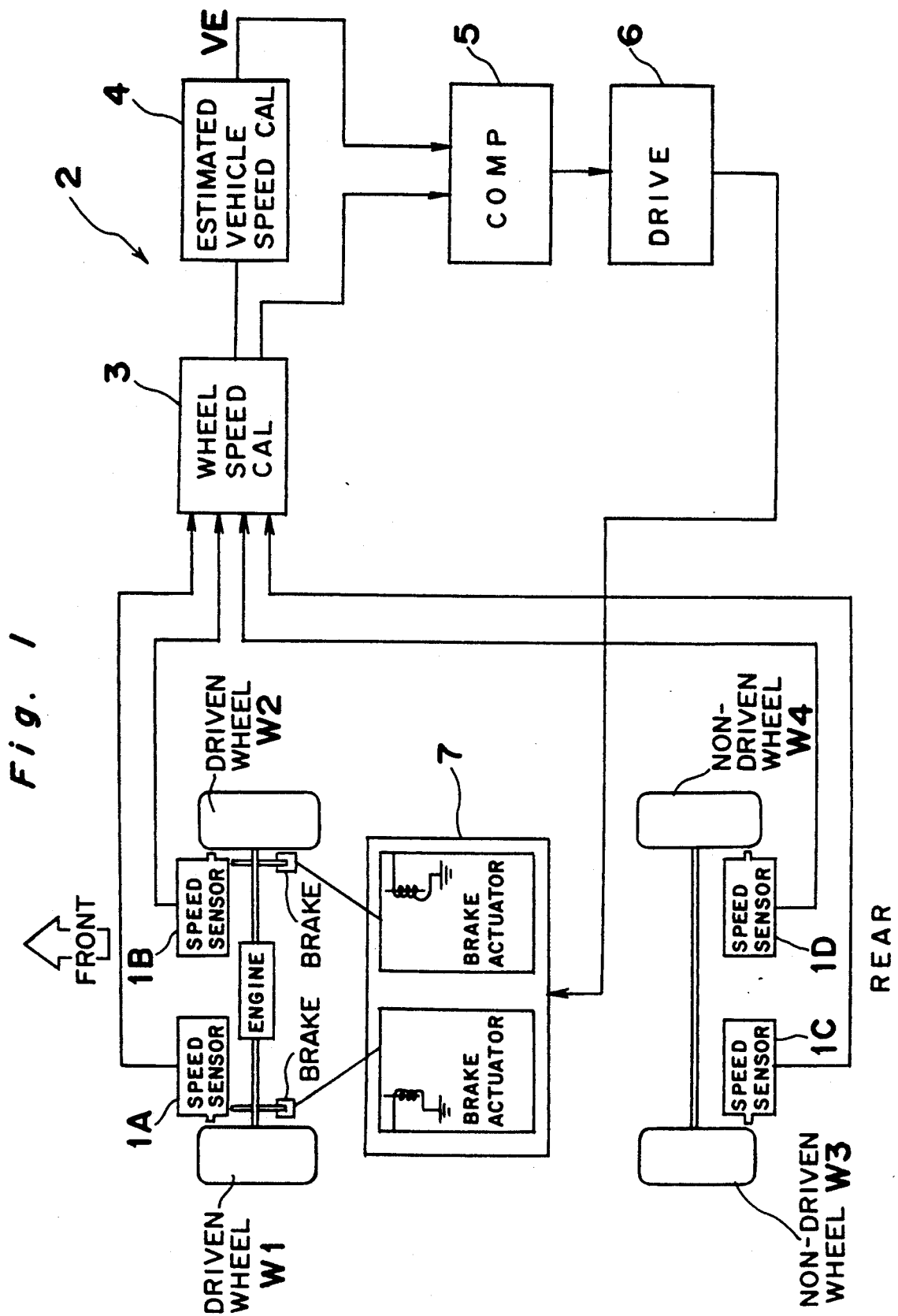
FIG. 1 is a block diagram schematically showing a control device according to one embodiment of the present invention.

Referring to a block diagram shown in FIG. 1, an antilock control device according to one embodiment of the present invention is provided with wheel speed sensors 1A, 1B, 1C and 1C respectively for detecting the wheel speeds of the front left wheel W1, front right wheel W2, rear left wheel W3 and rear right wheel W4. Signals from these sensors 1A, 1B, 1C and 1D are inputted to a control unit 2, particularly to wheel speed calculator 3 in which the wheel speed of each wheel is calculated based on the sensor signals. The calculated wheel speeds are inputted to an estimated vehicle speed calculator 4 which calculates the estimated speed of the vehicle in a manner as will be described later. Then, the estimated vehicle speed is compared with each wheel speed in a comparator 5. By the result obtained from comparator 5, it is judged whether or not the wheel is in the process of being locked, or whether or not the wheel is in the process of recovering from the locked condition. The judged result is applied to a drive control 6. Thus, an actuator 7, such as solenoid device for the antilock control is driven to control the hydraulic brake pressure applied to brakes B1 and B2.

Figure 2:
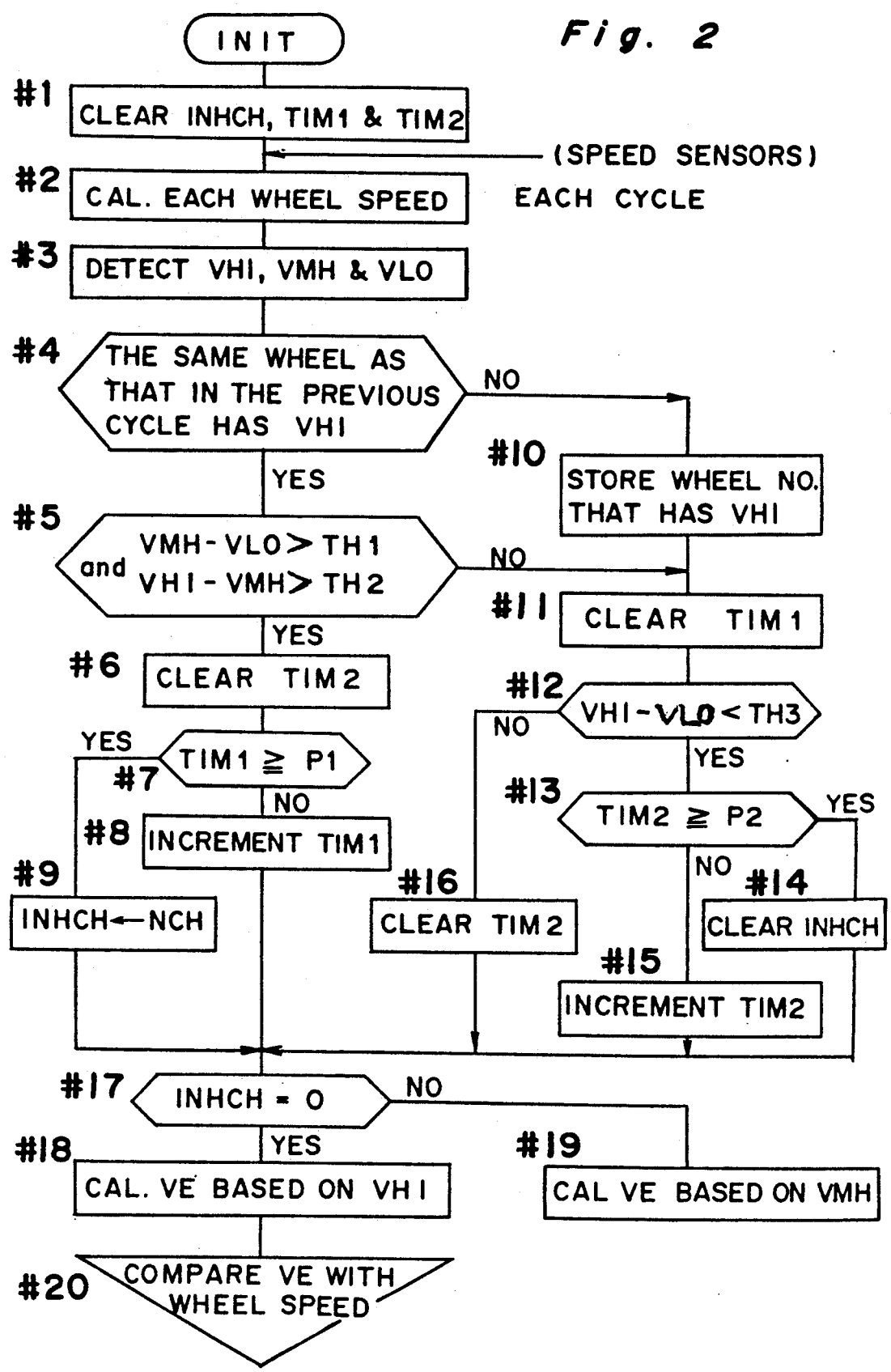
FIG. 2 is a flow-chart showing a control operation of the control device of FIG. 1.

Referring to FIG. 2, the flow chart shows the operations carried out in the wheel speed calculator 3 and the estimated vehicle speed calculator 4.

At step #1, i.e., during the motor vehicle is in the stopped condition, a register INHCH, for storing a data representing an inhibited wheel is cleared, and timers TIM1 and TIM2 are cleared to be 0 for starting the count up from the beginning. The term "inhibited wheel" is used for representing the wheel which should not be used for calculating the estimated vehicle speed.

When the wheels W1–W4 are rotated, a wheel speed signal is generated from each wheel sensor every predetermined cycle, and is applied to wheel speed calculator 3, and the wheel speed of each wheel is calculated (step #2). The obtained wheel speeds of the four wheels are inputted to the estimation circuit 4 in which an estimated vehicle speed VE will be calculated, as described hereinbelow.

At step #3, the wheel that has the highest speed VHI, the wheel that has the second highest speed VMH and the wheel that has the lowest speed VLO are detected, together with such speeds. It is assumed that wheel W1 has the highest speed VHI, wheel W2 has the second highest speed VMH, and wheel W3 has the lowest speed VLO. Then, at step #4, it is detected whether or not the same wheel (W1) as that in the previous cycle has the highest speed VHI.

When the result of step #4 is YES, meaning that the same wheel has the highest speed VHI, it is further detected at step #5 whether or not a difference between the second highest speed VMH and the lowest speed VLO is greater than a predetermined first threshold TH1 ($VMH - VLO > TH1$), and at the same time, whether or not a difference between the highest wheel speed VHI and the second highest wheel speed VMH is greater than a predetermined second threshold TH2 ($VHI - VMH > TH2$). The second threshold TH2 is determined in proportion to the estimated vehicle speed VE.

In step #5, if the two inequalities are satisfied, the second timer TIM2 is cleared (step #6), and then, it is detected whether or not the first timer TIM1 has counted equal to or greater than a first predetermined period of time P1 (step #7). If the first timer TIM1 has counted equal to or greater than the time P1, a suffix number of the wheel having the highest wheel speed VHI (such suffix number is stored in register NCH in step #10) is shifted to inhibited wheel register INHCH (step #9). In the present assumption, since wheel W1 has the highest wheel speed VHI, the suffix number "1" of wheel W1 as carried in register NCH is stored in register INHCH.

Thereafter, at step #17, it is detected whether or not INHCH is equal to 0. If INHCH≠0, as in the present assumed case, the program goes to step #19 at which the estimated vehicle speed VE is calculated using the second highest wheel speed VMH.

On the other hand, when it is detected at step #7 that timer TIM1 has counted not more than the time P1, timer TIM1 is incremented (step #8). In this case, register INHCH remains in the cleared condition, and continues to hold "0". Accordingly, at step #17, since INHCH=0 is detected, the estimated vehicle speed VE is calculated using the highest wheel speed VHI.

In summary, the operation under steps #5 to #9 is as follows. When the following condition (I)

$$\left.\begin{array}{l} VMH - VLO > TH1, \\ \text{and} \\ VHI - VMH > TH2 \end{array}\right\} \quad \text{(i)}$$

is maintained for a period longer than a predetermined period P1, the wheel with the highest wheel speed VHI is stored as the inhibited wheel. In this case, the estimated vehicle speed VE is calculated based on the second highest wheel speed VMH. If, on the contrary, when the aforementioned condition (I) is maintained not longer than the predetermined period P1, there will be no inhibited wheel stored in register INHCH. Therefore the estimated vehicle speed VE is calculated based on the highest wheel speed VHI.

If it is detected at step #4 that the wheel that has the highest wheel speed VHI is different from that detected in the previous cycle, for example, if it is detected that wheel W2 has the highest speed in this cycle and different wheel had the highest speed in the previous cycle, the suffix number of wheel W2, i.e., "2", is stored in register NCH (step #10). Thereafter, timer TIM1 is cleared (step #11). Step #11 is also attained when it is detected at step #5 that the above condition (I) is not satisfied.

Thereafter, at step #12, it is detected whether or not the difference between the highest wheel speed VHI and the lowest wheel speed VLO is not more than a third threshold TH3, i.e., whether or not the following condition (II)

$$VHI - VLO < TH3 \quad \text{(II)}$$

is satisfied. If condition (II) is not satisfied, the second timer TIM2 is cleared at step #16.

At step #12, if it is detected that condition (II) is satisfied, the program goes to step #13 at which it is detected whether or not timer TIM2 has counted a predetermined period of time P2. If the period P2 has been counted, register INHCH is cleared at step #14, so that the variable, representing the wheel number, stored therein for the inhibition of the wheel is changed to be 0. In other words, any inhibition of the use of the detected highest wheel speed (VHI) as inhibited at step #9 is cancelled at step #14. On the other hand, if the second timer TIM2 has not yet counted the period P2, timer TIM2 is incremented (step #15).

After step #14, #15 or #16, it is detected at step #17 whether or not the register INHCH is carrying 0 as described above. Thereafter, the estimated vehicle speed VE is calculated at step #18 or #19 by the above described manner.

In summary, the operation under steps #10 to #16 is as follows. When it is detected that condition (II) is satisfied for a period of time longer than the second predetermined time period P2, any one of the four wheels is permitted to use for the calculation of the estimated vehicle speed.

According to one embodiment, the following condition is met:

$$TH1 = TH3$$
and
$$P1 = P2$$

but in other embodiments, a different condition can be met.

In step #18 or #19, any conventional suitable method may be employed for obtaining the estimated vehicle speed. For example, the present invention can be used in combination with other invention, such as the invention proposed to obtain the estimated vehicle speed with the elimination of inconveniences generated when the wheels are idling, thereby increasing the accuracy of the estimation.

As is clear from the foregoing description, according to the antilock control device of the present invention, when a wheel of a smaller diameter is used for one of the wheels of the motor vehicle, such a wheel is not used for the calculation of estimated vehicle speed. Therefore, the tendency of the wheel towards the locked condition or towards unlocked condition can be detected with high accuracy. Accordingly, unnecessary reduction of the brake pressure can be avoided. Moreover, the lack of braking force caused by the insufficient application of the pressure during the recovering from the locked condition can be avoided.

Furthermore, when the wheel of a smaller diameter is not mounted in the vehicle, the wheel with the highest speed is detected from the four wheels, and the detected wheel is used for the calculation of the estimated vehicle speed, so that the accuracy of the estimated vehicle speed can be maintained.

When the normal size wheel is detected erroneously as a small diameter wheel, such as when the vehicle is making a rapid turn, the detected wheel will be identified as an inhibited wheel, but such an identification will be immediately released in view of the running state thereafter, and the wheel is permitted again to be used for the calculation of the estimated vehicle speed.

Although the present invention has been fully described by way of example with reference to the accompanying drawings, various changes and modifications would be apparent to those skilled in the art. Therefore, unless otherwise such changes and modifications depart from the scope of the present invention, they should be construed as included therein.

What is claimed is:

1. A small diameter wheel detecting system used in a vehicle comprising:
    sensor means for sensing wheel speed of each of wheels mounted in said vehicle and for detecting a highest wheel speed, a second highest wheel speed and a lowest wheel speed;
    first detector means for detecting a first condition such that a difference between the second highest wheel speed and the lowest wheel speed is greater than a first threshold and, at the same time, a difference between the highest wheel speed and the second highest wheel speed is greater than a second threshold;
    a first timer for counting a first predetermined time period; and
    an identifying means for identifying, when said first condition lasts longer that said first predetermined time period, the wheel with said highest wheel speed as a small diameter wheel.

2. The small diameter wheel detecting system as claimed in claim 1, further comprising:
    a second detector for detecting a second condition such that a difference between the highest wheel speed and the second highest wheel speed is less that a third threshold;
    a second timer for counting a second predetermined time period; and
    a cancelling means for cancelling the identification of said wheel as identified by said identifying means.

3. The small diameter wheel detecting system as claimed in claim 2, wherein said first threshold is equal to said third threshold.

4. The small diameter wheel detecting system as claimed in claim 2, wherein said first time period is equal to said second time period.

5. The small diameter wheel detecting system as claimed in claim 1, wherein said second threshold is set in proportion to said estimated vehicle speed.

6. The small diameter wheel detecting system as claimed in claim 2, wherein said second threshold is set in proportion to said estimated vehicle speed.

7. The small diameter wheel detecting system as claimed in claim 3, wherein said second threshold is set in proportion to said estimated vehicle speed.

8. The small diameter wheel detecting system as claimed in claim 4, wherein said second threshold is set in proportion to said estimated vehicle speed.

9. An antilock control system for controlling a brake pressure of a motor vehicle having a plurality of wheels by comparing each wheel speed with an estimated vehicle speed, which is obtained using a highest wheel speed of the wheels of said vehicle, comprising:
    sensor means for sensing a speed of each of the wheels mounted in said vehicle and for detecting a highest wheel speed, a second highest wheel speed and a lowest wheel speed;
    a first detector for detecting a first condition such that a difference between the second highest wheel speed and the lowest wheel speed is greater than a first threshold and, at the same time, a difference between the highest wheel speed and the second highest wheel speed is greater than a second threshold;
    that a first timer for counting a first predetermined time period and an inhibiting means for inhibiting, when said first condition lasts longer than said first predetermined time period, the use of said highest wheel speed for calculating said estimated vehicle speed (VE).

10. The antilock control system as claimed in claim 9, characterized in that a second detector is provided for detecting a second condition such that a difference between the highest wheel speed and the second highest wheel speed is less than a third threshold and, a second timer is provided for counting a second predetermined time period, and a cancelling means is provided for canceling any inhibition of the use of the detected highest wheel speed as inhibited by said inhibiting means.

* * * * *